United States Patent

Rafferty et al.

[11] Patent Number: 6,141,719
[45] Date of Patent: Oct. 31, 2000

[54] USB SELECTOR SWITCH

[75] Inventors: Jarrod S. Rafferty, Kent; Elizabeth L. Craddock, Lyndhurst, both of Ohio

[73] Assignee: Network Technologies, Inc., Aurora, Ohio

[21] Appl. No.: 09/209,202

[22] Filed: Dec. 10, 1998

[51] Int. Cl.[7] .............................. G06F 13/00; G06F 13/38
[52] U.S. Cl. ........................... 710/131; 710/129; 710/62; 710/100; 710/101
[58] Field of Search ................................... 710/100, 101, 710/129, 131, 60, 62

[56] References Cited

U.S. PATENT DOCUMENTS

| | | |
|---|---|---|
| 4,468,612 | 8/1984 | Starr . |
| 4,876,712 | 10/1989 | Brint et al. . |
| 4,972,470 | 11/1990 | Farago ........................................ 380/3 |
| 5,181,858 | 1/1993 | Matz et al. . |
| 5,226,123 | 7/1993 | Vockenhuber . |
| 5,330,370 | 7/1994 | Reddersen et al. . |
| 5,347,113 | 9/1994 | Reddersen et al. . |
| 5,369,593 | 11/1994 | Papamarcos et al. . |
| 5,524,362 | 6/1996 | Quandt et al. . |
| 5,542,053 | 7/1996 | Bland et al. . |
| 5,613,096 | 3/1997 | Danknick et al. . |
| 5,664,229 | 9/1997 | Bhargava et al. . |
| 5,699,533 | 12/1997 | Sakai . |
| 5,721,842 | 2/1998 | Beasley et al. . |
| 5,724,529 | 3/1998 | Smith et al. . |
| 5,734,334 | 3/1998 | Hsieh et al. . |
| 5,752,032 | 5/1998 | Keller et al. . |
| 5,758,099 | 5/1998 | Grieco et al. . |
| 5,761,447 | 6/1998 | Knox et al. . |
| 5,761,448 | 6/1998 | Adamson et al. . |
| 5,768,568 | 6/1998 | Inui et al. . |
| 5,781,748 | 7/1998 | Santos et al. . |
| 5,784,581 | 7/1998 | Hannah ...................................... 710/10 |
| 5,784,702 | 7/1998 | Greenstein et al. . |
| 5,799,171 | 8/1998 | Kondou . |
| 5,903,777 | 3/1999 | Brief ......................................... 710/60 |

Primary Examiner—Ario Etienne
Attorney, Agent, or Firm—Pearne & Gordon LLP

[57] ABSTRACT

A switch for connecting a peripheral device to a downstream USB device includes a plurality of peripheral interfaces operably connectable to respective peripheral devices; a USB downstream interface operably connectable to the downstream USB device, where the downstream interface is adapted to simulate insertion and removal of an upstream USB device; and a switcher for selectively establishing communication between a desired peripheral interface and the USB downstream interface.

15 Claims, 3 Drawing Sheets

USB SELECTOR SWITCH

BACKGROUND OF THE INVENTION

The present invention relates to a switch for selectively attaching desired peripheral devices to a desired Universal Serial Bus device.

Universal Serial Bus (USB) is a peripheral bus standard developed by the PC and telecom industry, including Compaq, DEC, IBM, Intel, Microsoft, NEC and Northern Telecom. USB defines a bus and protocols for the connection of computer peripherals to computers (and to each other). "Universal Serial Bus Specification", Compaq, Intel, Microsoft, NEC, Revision 1.1, Sep. 23, 1998, describes USB and its implementation and is incorporated herein by reference. Proposed and actual USB devices include keyboards, mice, telephones, digital cameras, modems, digital joysticks, CD-ROM drives, tape and floppy drives, digital scanners, printers, MPEG-2 video-base products, data digitizers and other relatively low bandwidth devices. USB supports data rates of up to 12 Mbits/sec.

USB supports the dynamic insertion and removal of devices from the bus. USB recognizes actual peripherals or "functions"; hosts (typically a computer); and hubs, which are intermediate nodes in the network that allow the attachment of multiple upstream hubs or functions. Upon insertion of an upstream hub or function, the host/hub on the downstream side of the bus initiates a bus enumeration to identify and configure the new device. Upon removal, the removed device is "forgotten". Referring to FIGS. 1 and 2, the process of enumeration is triggered by a pull-up resistor $R_{pu}$ inside the new device that is connected to one of the USB data lines $D^+$, $D^-$. One side of $R_{pu}$ is connected to a voltage related to the bus supply voltage $V_{BUS}$ and the other is connected to D+ for a high-speed connection (less than 12 Mbits/sec) or to D− for a low-speed connection (less than 1.5 Mbits/sec). When a device is plugged into the bus, the voltage across $R_{pu}$ is detected by the downstream host/hub and when the device is removed, the absence of the voltage is detected by the downstream host/hub.

The USB specification expects devices to be physically plugged in or removed from the bus in order to be recognized or "forgotten". It is desirable to be able to share the various new USB peripherals with more than one USB computer. It is also desirable to be able to control several USB computers with a single USB mouse and keyboard combination. Unfortunately, these type operations are not supported in the USB specification.

SUMMARY OF THE INVENTION

A switch for connecting a peripheral device to a downstream USB device includes a plurality of peripheral interfaces operably connectable to respective peripheral devices; a USB downstream interface operably connectable to the downstream USB device, where the downstream interface is adapted to simulate insertion and removal of an upstream USB device; and a switcher for selectively establishing communication between a desired peripheral interface and the USB downstream interface.

Another embodiment of the invention includes a plurality of peripheral interfaces operably connectable to respective peripheral devices; a plurality of USB downstream interfaces operably connectable to respective downstream USB devices, where each downstream interface is adapted to simulate insertion and removal of an upstream USB device; and a switcher for selectively establishing communication between a desired peripheral interface and a desired USB downstream interface.

DESCRIPTION OF THE PREFERRED EMBODIMENTS

Figure 1:
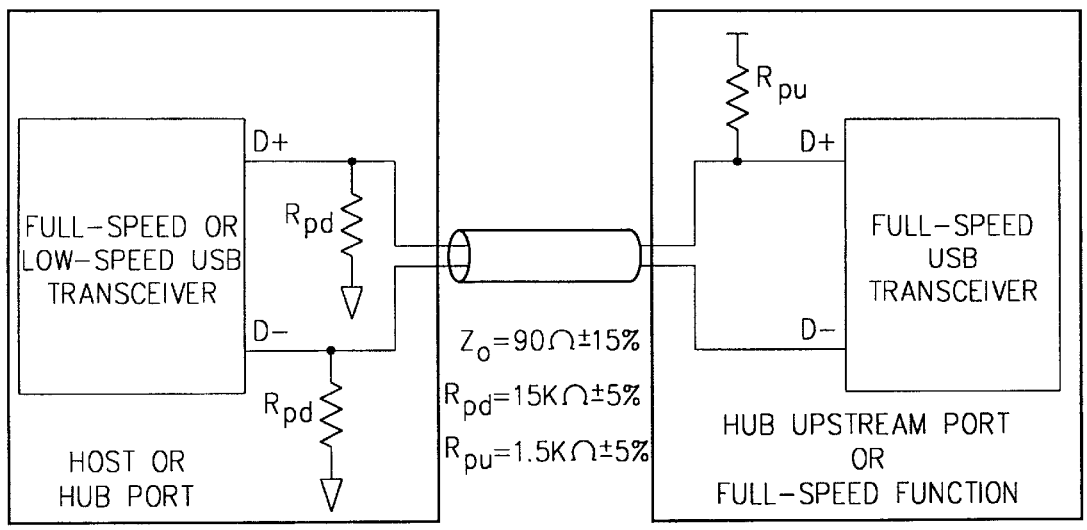
FIG. 1 is a block diagram of a standard USB high-speed connection.
Figure 2:
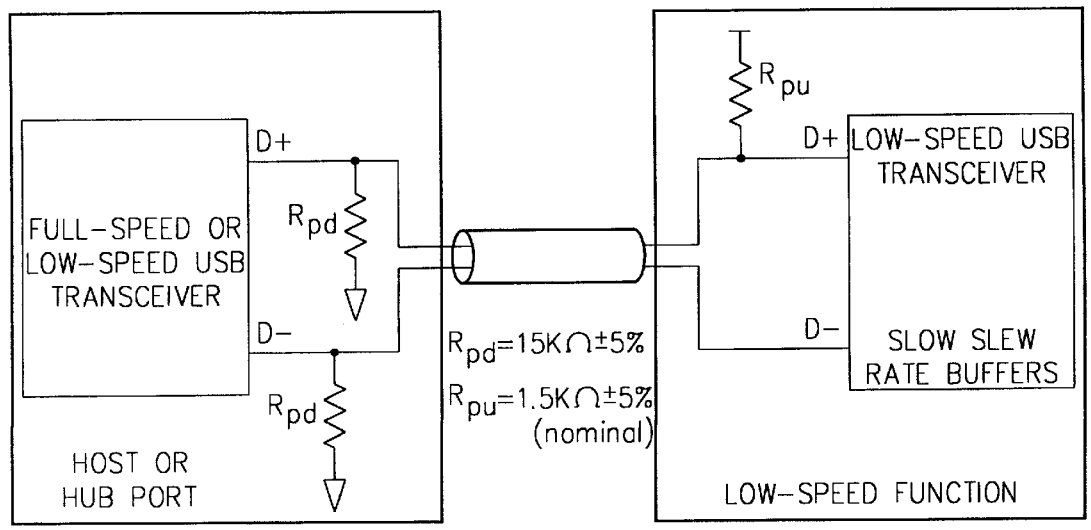
FIG. 2 is a block diagram of a standard USB low-speed connection.
Figure 3:
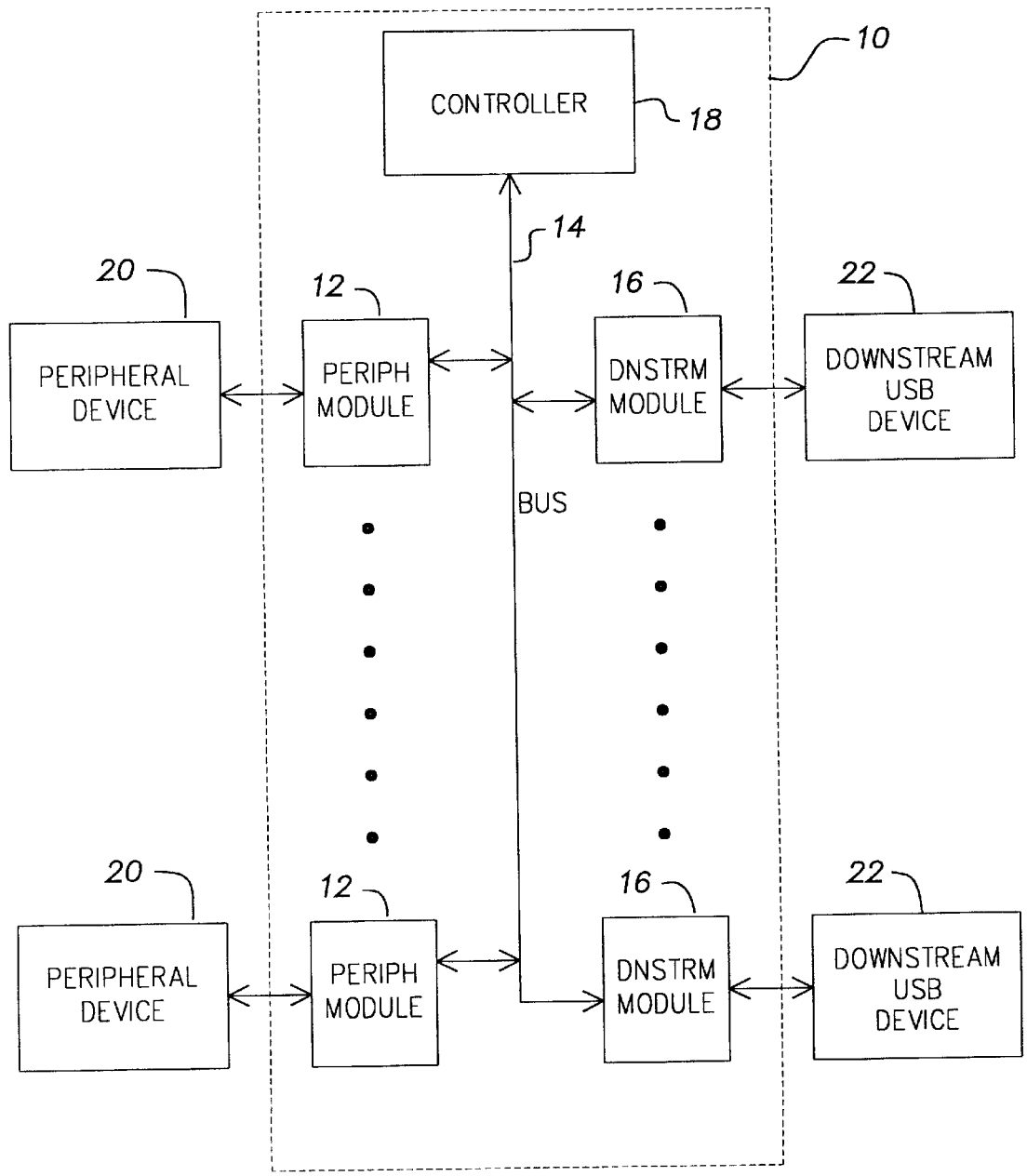
FIG. 3 is a block diagram of a switch according to the invention connected to peripheral devices and downstream USB devices.

Referring to FIG. 3, a switch 10 includes peripheral modules 12 connected to a central bus 14. There may be, for example, eight peripheral modules, but there may be more or less. Downstream USB modules 16 are also connected to the central bus 14. There may be, for example, thirty-two downstream modules, but there may be more or less. The bus 14 is also connected to the controller 18.

A peripheral module 12 may act as an interface for both non-USB peripherals (e.g., a conventional mouse and keyboard) and USB peripherals (e.g., mouse, keyboard, modem, printer, scanner, audio device, game controller, or other, relatively low bandwidth device). Alternatively, USB and non-USB peripheral interfaces may each be in separate modules or not modularized at all.

A downstream module 16 may act as an interface for USB computers (hosts) or downstream USB hubs. Alternatively, the downstream interfaces may not be modularized.

The peripheral module 12 receives digital data from an attached peripheral 20. Based on the type of peripheral connected, the peripheral module 12 encodes the data onto the bus 14. As part of the encoding process, an "address" of the desired destination of the peripheral signal is included with the encoded signal. This address corresponds to one of the downstream modules 16 or to the controller 18. The peripheral module 12 may be implemented, for example, by a cpu, memory and i/o circuits; a single chip computer; an application specific integrated circuit; field programmable gate arrays; or other programmable circuits.

The bus 14 may be, for example, a $i^2c$ bus. The $i^2c$ bus is a two-wire bidirectional bus based on a standard developed by Philips Electronics.

The downstream module 16 sends digital data to an attached downstream USR device 22 (e.g., a USB computer or hub). The downstream module 16 may be implemented, for example, by a cpu, memory and i/u circuits; a single chip computer; an application specific integrated circuit; field programmable gate arrays; or other programmable circuits.

In the preferred embodiment, the encoded signals on the bus are supplied to all of the peripheral modules 12, downstream modules 16 and the controller 18 at the same time. Only the module or controller that is assigned the encoded address responds to the encoded signals. Where the address corresponds to one of the downstream modules 16, the associated downstream module decodes the signals and sends them to the attached downstream device 22. Where the address corresponds to the controller 18, the signals are decoded by the controller 18. The controller 18 may be implemented, for example, by a cpu, memory and i/o circuits; a single chip computer; an application specific integrated circuit; field programmable gate arrays; or other programmable circuits. The controller 18 may he a separate module, contained in a module 12, 16 or not modularized at all.

In the preferred embodiment, the address for the encoded data is supplied to the peripheral modules 12 by the controller 18 via the bus 14. The address is selected by, for example, special keyboard "hot-keys" (e.g., unusual combinations of keystrokes) that are automatically directed by a peripheral module 12 to the controller 18. The controller 18 may also respond to the "hot-keys" by generating an on-screen display (not shown) for further selections by keyboard or mouse. The address may also be determined by switches (not shown) connected to the controller 18. It is also possible to have the address provided by data from a downstream device 16.

Figure 4:
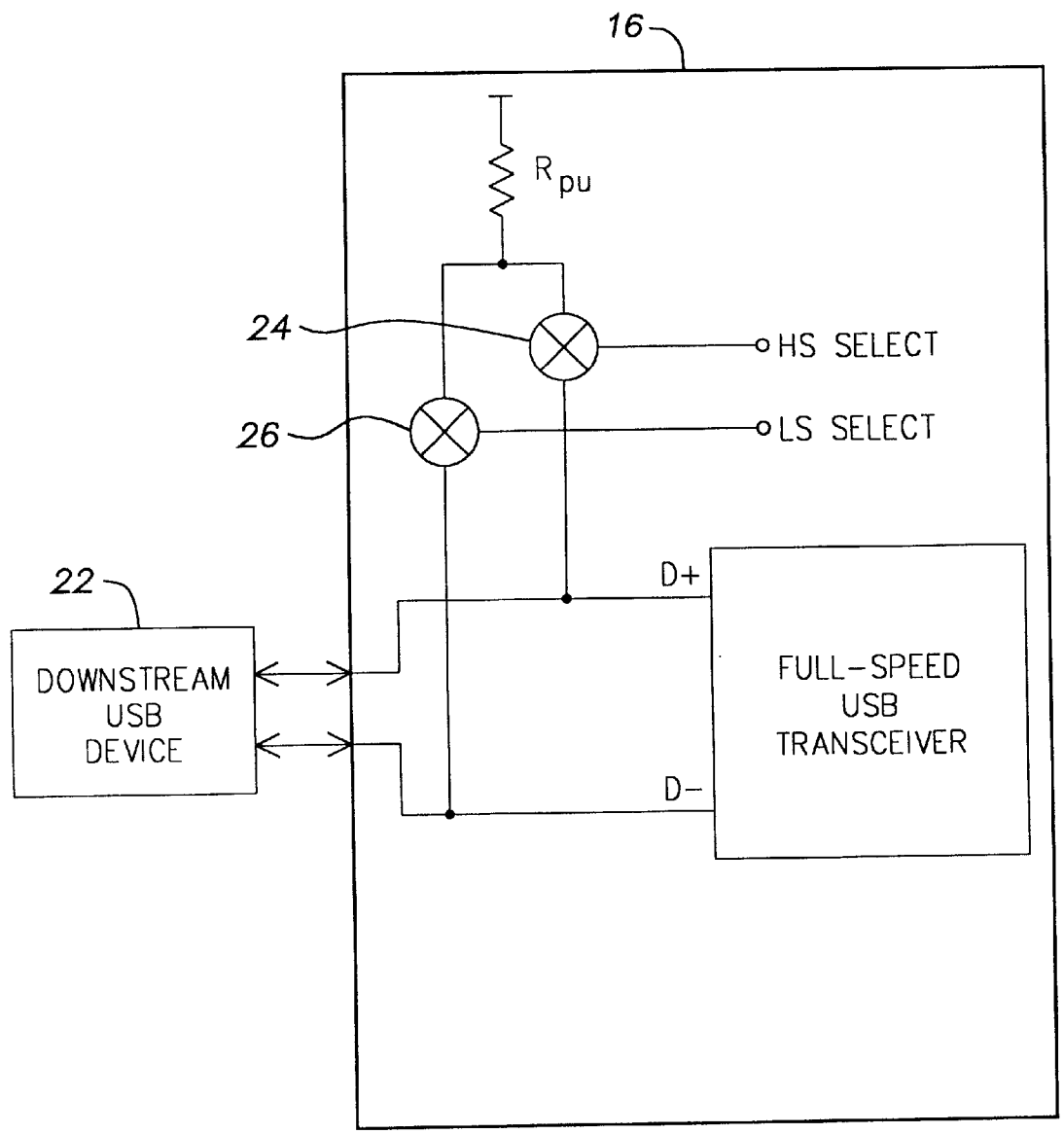
FIG. 4 is a block diagram of a insertion/removal simulation circuit according to the invention.

Referring to FIG. 4, the downstream module 16 also includes circuitry for simulating the insertion and removal of USB devices from the downstream USB device 22. The pull-up resistor $R_{pu}$ is connected at one end to a voltage corresponding to the USB bus voltage $V_{BUS}$, the other end is connected to the switches 24, 26. The switches 24, 26 may be, for example, FETs, relays, or other switching devices now or later known in the art. When the switch 24 is "on", the downstream USB device 22 will start a high speed bus enumeration. When the switch 26 is "on", the downstream USB device will start a low speed bus enumeration. When the switches 24, 26 are "off", the downstream USB device 22 will sense a removal. In the preferred embodiment, the switches 24, 26 are controlled by data supplied from a corresponding peripheral module 12 based on the respective peripheral device 20 connected to the peripheral module 12 and by direction from the controller 18.

In operation, the peripheral module 12 translates data from the peripheral device 20 to data for the bus 14 including not only the data from the peripheral 20, but also, the address of the desired downstream module 16, the type of device and, in the case of USB devices, the USB configuration data. The data travels on the bus 14 to the downstream module 16. The desired downstream module 16 translates the data from the bus 14 to data for the desired downstream USB device 22.

When the switch 10 is powered up, the switches 24, 26 of a downstream module 16 are both off and no devices are detected by the downstream USB devices 22. Once the switch 10 is ready for operation, the switches 24, 26 are operated in accordance with the peripheral module 12, if any, that is communicating with the downstream module 16.

The present invention allows both USB peripherals and non-USB peripherals to be used with downstream USB devices. In addition, it permits the sharing of the new types of peripherals being planned and manufactured for use on the with the Universal Serial Bus.

It should be noted that while the preferred embodiment uses a data bus as the switcher to move information between selected modules, it is also possible to connect the modules using a crosspoint switch, parallel address, shift registers or any other signal routing technique known in the art. The peripheral modules translate the specific signals to a common "language", a switcher routes the signals to the proper downstream module, and the downstream module then translate the common "language" to the appropriate specific signals.

If all of the devices are USB devices, the common "language" can be basically "USB" and the peripheral modules need not be much more than USB jacks. The downstream modules will simulate insertion and removal and then the USB devices will perform their own bus enumeration.

For the ease of understanding, the flow of data has been described as from the peripherals to the downstream devices, but in the preferred embodiment, the flow of data is bidirectional. This is particularly important when using USB devices that are output or bidirectionally oriented (e.g., modem, printer, scanner, audio device).

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed:

1. A switch for connecting a peripheral device to a downstream USB device, said switch comprising:

a plurality of peripheral interfaces operably connectable to respective peripheral devices;

a USB downstream interface operably connectable to said downstream USB device, said downstream interface being adapted to simulate insertion and removal of an already inserted upstream USB device; and a switcher for selectively establishing communication between a desired peripheral interface and said USB downstream interface.

2. A switch according to claim 1, wherein at least one of said peripheral devices is an upstream USB device.

3. A switch according to claim 1, wherein said simulation of insertion or removal of an upstream USB device is provided by applying or removing, respectively, a voltage to a data line of said USB downstream interface.

4. A switch for connecting a peripheral device to a downstream USB device, said switch comprising:

a peripheral interface operably connectable to said peripheral device;

a plurality of USB downstream interfaces operably connectable to respective downstream USB devices, each said downstream interface being adapted to simulate insertion and removal of an already inserted upstream USB device; and a switcher for selectively establishing communication between said peripheral interface and a desired USB downstream interface.

5. A switch according to claim 4, wherein said peripheral device is an upstream USB device.

6. A switch according to claim 4, wherein said simulation of insertion or removal of an upstream USB device is provided by applying or removing, respectively, a voltage to a data line of said USB downstream interfaces.

7. A switch for connecting a peripheral device to a downstream USB device, said switch comprising:

a plurality of peripheral interfaces operably connectable to respective peripheral devices;

a plurality of USB downstream interfaces operably connectable to respective downstream USB devices, each said downstream interface being adapted to simulate insertion and removal of an already inserted upstream USB device; and a switcher for selectively establishing communication between a desired peripheral interface and a desired USB downstream interface.

8. A switch according to claim 7, wherein at least one of said peripheral devices is an upstream USB device.

9. A switch according to claim 7, wherein said simulation of insertion or removal of an upstream USB device is provided by applying or removing, respectively, a voltage to a data line of said USB downstream interfaces.

10. A switch for connecting an upstream USB device to a downstream USB device, said switch comprising:

a plurality of USB upstream interfaces operably connectable to respective upstream USB devices;

a USB downstream interface operably connectable to said downstream USB device, said downstream interface being adapted to simulate insertion and removal of an already inserted upstream USB device; and a switcher for selectively establishing communication between a desired upstream USB interface and said USB downstream interface.

11. A switch according to claim 10, wherein said simulation of insertion or removal of an upstream USB device is provided by applying or removing, respectively, a voltage to a data line of said USB downstream interface.

12. A switch for connecting an upstream USB device to a downstream USB device, said switch comprising:

a USB upstream interface operably connectable to said upstream USB device;

a plurality of USB downstream interfaces operably connectable to respective downstream USB devices, each said downstream interface being adapted to simulate insertion and removal of an already inserted upstream USB device; and a switcher for selectively establishing communication between said upstream USB interface and a desired USB downstream interface.

13. A switch according to claim 12, wherein said simulation of insertion or removal of an upstream USB device is provided by applying or removing, respectively, a voltage to a data line of said USB downstream interfaces.

14. A switch for connecting an upstream USB device to a downstream USB device, said switch comprising:

a plurality of USB upstream interfaces operably connectable to respective upstream USB devices;

a plurality of USB downstream interfaces operably connectable to respective downstream USB devices, each said downstream interface being adapted to simulate insertion and removal of an already inserted upstream USB device; and a switcher for selectively establishing communication between a desired upstream USB interface and a desired USB downstream interface.

15. A switch according to claim 14, wherein said simulation of insertion or removal of an upstream USB device is provided by applying or removing, respectively, a voltage to a data line of said USB downstream interfaces.

* * * * *